United States Patent [19]
Hachiya

[11] Patent Number: 5,972,273
[45] Date of Patent: *Oct. 26, 1999

[54] METHOD FOR PRODUCING A HOMOGENEOUS POLYCARBONATE COMPOSITION

[75] Inventor: Hiroshi Hachiya, Kurashiki, Japan

[73] Assignee: Asahi Kasei Kogyo Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/701,218

[22] Filed: Aug. 21, 1996

[30] Foreign Application Priority Data

Aug. 21, 1995  [JP]  Japan ................................. 7-211729

[51] Int. Cl.$^6$ ....................................................... B29B 7/30
[52] U.S. Cl. ........................... 264/349; 523/351; 525/462
[58] Field of Search ............................. 264/211.24, 349, 264/331.21; 528/196, 198, 204; 525/462; 523/351

[56] References Cited

U.S. PATENT DOCUMENTS

| | | | |
|---|---|---|---|
| 3,507,951 | 4/1970 | Morecroft et al. ....................... | 264/349 |
| 5,278,279 | 1/1994 | Kanno et al. ............................ | 528/198 |
| 5,387,628 | 2/1995 | Kanno et al. ............................ | 524/117 |
| 5,391,690 | 2/1995 | Kanno et al. ............................ | 528/198 |
| 5,405,934 | 4/1995 | Oshino et al. ........................... | 528/204 |
| 5,466,774 | 11/1995 | Kanno et al. ............................ | 528/199 |
| 5,494,992 | 2/1996 | Kanno et al. ............................ | 528/196 |
| 5,498,688 | 3/1996 | Oshino, II et al. ...................... | 528/198 |
| 5,589,564 | 12/1996 | Komiya et al. .......................... | 528/196 |
| 5,597,887 | 1/1997 | King, Jr. et al. ........................ | 528/196 |
| 5,606,007 | 2/1997 | Sakashita et al. ....................... | 528/176 |
| 5,627,228 | 5/1997 | Kobayashi ............................... | 524/127 |

FOREIGN PATENT DOCUMENTS

| | | |
|---|---|---|
| 0 559 953 | 9/1993 | European Pat. Off. . |
| 5-46843 | 7/1986 | Japan . |
| 4-103626 | 6/1992 | Japan . |
| 5-310906 | 11/1993 | Japan . |

OTHER PUBLICATIONS

Principles of Polymerization, 2nd. Ed, George Odian, John Wiley & Sons, 1981, pp. 146–147.

Encyclopedia Of Polymer Science And Engineering, vol. 7, John Wiley & Sons, 1989, p. 410.

*Primary Examiner*—Jan H. Silbaugh
*Assistant Examiner*—Mark Eashoo
*Attorney, Agent, or Firm*—Jacobson, Price, Holman & Stern, PLLC

[57] ABSTRACT

Disclosed is a method for producing a homogeneous polycarbonate composition, which comprises feeding a first polycarbonate in a molten state to a first inlet of an extruder, while feeding a mixture of an second polycarbonate and at least one thermal stabilizer to a second inlet of the extruder, wherein the second inlet is disposed downstream of the first inlet, and extruding the first polycarbonate and the mixture through the extruder. By the method of the present invention, additives can be uniformly dispersed in a molten polycarbonate without dissolving the additives in a solvent, and a polycarbonate composition of the polycarbonate and the additive, which has various excellent properties, such as excellent thermal stability, can be produced efficiently.

18 Claims, 3 Drawing Sheets

METHOD FOR PRODUCING A HOMOGENEOUS POLYCARBONATE COMPOSITION

BACKGROUND OF THE INVENTION

1. Field of the Invention

The present invention relates to a method for producing a homogeneous polycarbonate composition. More particularly, the present invention is concerned with a method for producing a homogeneous polycarbonate composition of a polycarbonate and an additive, which comprises feeding a main polycarbonate in a molten state to a first inlet of an extruder, while feeding a resin/additive mixture of an auxiliary polycarbonate and at least one additive to a second inlet of the extruder, wherein the second inlet is disposed downstream of the first inlet, and extruding the main polycarbonate and the resin/additive mixture through the extruder. By the method of the present invention, additives can be uniformly dispersed in a molten polycarbonate, so that a polycarbonate composition having various excellent properties can be produced efficiently. For example, when a thermal stabilizer is added to and mixed with a molten polycarbonate by the method of the present invention, a polycarbonate composition having excellent thermal stability can be produced efficiently.

2. Prior Art

In recent years, polycarbonates have been widely used in various fields as engineering plastics which have excellent heat resistance, impact resistance and transparency. Various studies have been made with respect to processes for producing polycarbonates. Up to now, processes, such as one utilizing interfacial condensation polymerization of an aromatic dihydroxy compound, such as 2,2-bis(4-hydroxyphenyl)propane (hereinafter, frequently referred to as "bisphenol A"), with phosgene (hereinafter, frequently referred to as the "phosgene process"), have been commercially practiced. In the phosgene process, a mixed solvent of water or an aqueous alkali solution and a water-immiscible organic solvent are generally used (a mixed solvent of an aqueous sodium hydroxide solution and methylene chloride is practically employed as the mixed solvent); a tertiary amine or a quanternary ammonium compound is employed as a catalyst; and chlorine-containing by-products, such as hydrogen chloride are formed, and for example, hydrogen chloride is removed as a salt thereof with a base.

However, in the phosgene process, (1) toxic phosgene must be used; (2) due to the by-produced chlorine-containing compounds, such as hydrogen chloride and sodium chloride, an apparatus used is likely to be corroded; (3) it is difficult to remove impurities, which adversely influence the properties of the desired polycarbonate, such as sodium chloride, from the polymer; and (4) since methylene chloride (which is generally used as a reaction solvent) is a good solvent for polycarbonate and has a strong affinity to polycarbonate, the methylene chloride inevitably remains in produced polycarbonate. With respect to the remaining methylene chloride, removal thereof is extremely costly, and complete removal of the remaining methylene chloride from the obtained polycarbonate is almost impossible. Further, it is noted that the methylene chloride remaining in the polymer is likely to be decomposed, e.g., by heat at the time of molding the polymer, thereby forming hydrogen chloride, which not only causes corrosion of a molding machine but also lowers the quality of a molded product.

As mentioned above, the phosgene process involves too many problems, so that it has been desired to develop a process for producing a polycarbonate, which is free from difficulties inevitably accompanying the phosgene process.

Recently, a large number of researches and developments have been made with respect to a transesterification process for producing a polycarbonate from an aromatic dihydroxy compound and a carbonic diester, especially a melt transesterification process, which is attracting attention as a substitute for the phosgene process.

It is known that the melt transesterification process is advantageous in that a polycarbonate is obtained in a molten state at the time of completion of the polymerization reaction. For example, a polycarbonate obtained in a molten state can be directly subjected to pelletization and, hence, production of polycarbonate pellets can be conducted efficiently [see "Plastic Zairyo Koza 5, Polycarbonate Jushi (Lecture on Plastic Materials 5, Polycarbonate Resin)", p.62–67, published from The Nikkan Kogyo Shimbun Ltd. (The Daily Industrial News), Japan, 1969]. When it is desired to incorporate an additive into a polycarbonate in pellet form, it is necessary to mix polycarbonate pellets with an additive and melt the resultant mixture so as for the molten mixture to be melt-kneaded in an extruder. This operation is troublesome and economically disadvantageous. Therefore, it has been attempted to produce a polycarbonate/additive composition before a polycarbonate obtained in a molten form by a melt transesterification process is fabricated into pellets.

With respect to the method for producing a polycarbonate/additive composition obtained in a molten form by a melt transesterification process, wherein the additive, for example, a thermal stabilizer is incorporated, there can be mentioned Unexamined Japanese Patent Application Laid-Open Specification (Kokai) No. 5-310906 (corresponding to EP Publication 559953 and U.S. Pat. Nos. 5,278,279, 5,387, 628 and 5,391,690) and Examined Japanese Patent Application Publication (Kokoku) No. 5-46843, which disclose a method for adding a phosphorus-containing thermal stabilizer to a polycarbonate obtained in a molten form by a melt transesterification process, wherein the thermal stabilizer is added during the melt polymerization reaction. Further, another method for mixing a polycarbonate obtained by a melt transesterification process with additives is disclosed in Unexamined Japanese Patent Application Laid-Open Specification (Kokai) No. 4-103626, wherein a thermal stabilizer is added to a polycarbonate in a molten state immediately after completion of the melt polymerization reaction.

However, the method disclosed in Japanese Kokai No. 5-310906 and Japanese Kokoku No. 5-46843 has problems in that a lowering of the polymerization rate occurs due to the presence of the thermal stabilizer, and that the polycarbonate composition containing the polycarbonate and the thermal stabilizer suffers discoloration because decomposition and other undesired reactions of the thermal stabilizer occur during the polymerization reaction. On the other hand, the method disclosed in Japanese Kokai No. 4-103626, in which a thermal stabilizer is added after completion of the polymerization reaction, would be free from the above-mentioned problems accompanying the techniques disclosed in Japanese Kokai No. 5-310906 and Japanese Kokoku No. 5-46843. However, this prior art document only describes that a thermal stabilizer and a polycarbonate are kneaded using a twin-screw extruder, but contains no description as to how to add the thermal stabilizer to the polycarbonate and achieve intimate blending of the former with the latter.

On the other hand, with respect to a polycarbonate obtained in the phosgene process (wherein the polycarbonate is obtained in powder or slurry form), it is relatively easy to blend the polycarbonate with an additive, such as a thermal stabilizer, uniformly and obtain a homogeneous composition. Illustratively stated, in the case of a phosgene-process polycarbonate in powder or slurry form, first, a thermal stabilizer which is either dissolved in a solvent, such as methylene chloride, or not dissolved, is added to the polycarbonate; second, the polycarbonate and the thermal stabilizer are then mixed well in a batchwise manner by using, for example, a Henschel mixer, to thereby obtain a mixture; and, third, the obtained mixture is subjected to melt extrusion, thereby obtaining a homogeneous polycarbonate/thermal stabilizer composition. Thus, with respect to a polycarbonate obtained by the phosgene process, it is possible to obtain a homogeneous polycarbonate composition comprising the polycarbonate and an additive (e.g., thermal stabilizer), even when the additive is used in a very small amount. However, as mentioned above, the phosgene process involves too many problems.

As mentioned above, with respect to a polycarbonate obtained in a molten state by a melt transesterification process, it is very difficult to uniformly blend a molten polycarbonate with a small amount of an additive.

Generally, in formulation of a composition of a polycarbonate and an additive, such as a thermal stabilizer, the additive is added in an extremely small amount, specifically in an amount as small as 0.0001 to 0.1 part by weight, relative to 100 parts by weight of the polycarbonate. Therefore, in producing polycarbonate compositions from polycarbonates in molten form and additives, such as a thermal stabilizer, the following various difficulties are encountered.

When a thermal stabilizer in a solid state at room temperature is added to a polycarbonate in a molten state, the thermal stabilizer is heat-melted in a feeder having a pump and fed to an extruder by using the pump, and in the extruder, the thermal stabilizer is mixed with a molten polycarbonate. When a thermal stabilizer is heat-melted in a feeder, the thermal stabilizer is inevitably kept in a molten state for a relatively long period of time, so that the thermal stabilizer deteriorates by heat to suffer discoloration and, hence, the resultant polycarbonate composition, containing such a discolored thermal stabilizer, also suffers from discoloration. On the other hand, when a thermal stabilizer which is in a liquid state at room temperature is added to a polycarbonate, the thermal stabilizer is fed to an extruder by using a feeder having a pump, and in the extruder, the thermal stabilizer is mixed with a molten polycarbonate. In this case, there is a problem such that when the thermal stabilizer is used in a very small amount, the thermal stabilizer cannot be dispersed uniformly, so that when the obtained polycarbonate composition is subjected to molding (in which the composition is heat-melted), the polycarbonate composition suffers discoloration because of its non-homogeneity. On the other hand, a method has been proposed in which a thermal stabilizer which is either in a solid state or in a liquid state at room temperature is dissolved in a solvent, such as methylene chloride, so as to increase its volume, and is fed to a liquid inlet of an extruder. By this method, a thermal stabilizer is well dispersed in a polycarbonate. However, the solvent used for dissolving the thermal stabilizer remains in the obtained polycarbonate composition in an amount as large as several tens to several thousands ppm. A polycarbonate composition containing such a large amount of solvent has poor thermal stability, so that not only is the composition likely to suffer discoloration at the time of molding, but a molded article is also likely to suffer discoloration when it is used under high temperature conditions.

Further, when a thermal stabilizer in powder or granular form, as such, is fed to an auxiliary inlet of an extruder (which auxiliary inlet is provided separately form a main inlet for a polycarbonate and is originally intended for use in feeding such a type of additive as used in a relatively large amount, e.g. a filler, a glass fiber or a carbon fiber), the feeding rate of the thermal stabilizer cannot be controlled precisely at a predetermined level because the amount of the thermal stabilizer to be fed to the extruder per unit time is so small that it is extremely difficult to feed the thermal stabilizer precisely to an extruder by means of a feeder thereof. Therefore, the thermal stabilizer cannot be dispersed uniformly in a polycarbonate, so that the thermal stability of the obtained polycarbonate composition is poor and, hence, not only does the composition suffer discoloration at the time of molding, but a molded article is also likely to suffer discoloration when it is used under high temperature conditions. Further, no feeder is available which can be suitably used for feeding a thermal stabilizer in a very small amount.

As mentioned above, it is very difficult to uniformly disperse a small amount of an additive in a molten polycarbonate obtained by the melt transesterification process, especially when the additive is used in a very small amount. When the additive is dissolved in a solvent and mixed with the polycarbonate, the additive can be well dispersed in the polycarbonate. However, as mentioned above, when a thermal stabilizer is dissolved in a solvent and mixed with the polycarbonate, the solvent remains in the resultant polycarbonate composition, so that the composition has poor thermal stability. Thus, it has conventionally been impossible to uniformly disperse a small amount of an additive in a molten polycarbonate obtained by a transesterification process, so that a polycarbonate composition having various excellent properties, such as excellent thermal stability has not been obtained.

SUMMARY OF THE INVENTION

In these situations, the present inventor has made extensive and intensive studies with a view toward developing a method for uniformly dispersing an additive in a polycarbonate in a molten state without dissolving the additive in a solvent, such as methylene chloride, which enables production of a homogeneous polycarbonate composition having various excellent properties, for example, excellent thermal stability. As a result, it has been found that, even without dissolving the additive in a solvent, a homogeneous polycarbonate composition can be produced by a method which comprises feeding a main polycarbonate in a molten state to a first inlet of an extruder, while feeding a resin/additive mixture of an auxiliary polycarbonate and at least one additive to a second inlet of the extruder, wherein the main polycarbonate and the auxiliary polycarbonate are the same or different, and wherein the second inlet is disposed downstream of the first inlet, and extruding the main polycarbonate and the resin/additive mixture through the extruder.

Accordingly, it is an object of the present invention to provide a method for producing a homogeneous polycarbonate composition, having various excellent properties, for example, excellent thermal stability, by adding an additive to a molten polycarbonate which, for example, is obtained directly from a melt transesterification process or obtained by melting a solid polycarbonate produced, for example, by a solid-phase transesterification process.

It is another object of the present invention to provide a homogeneous polycarbonate composition having various excellent properties, for example, excellent thermal stability.

The foregoing and other objects, features and advantages of the present invention will be apparent from the following detailed description and appended claims taken in connection with the accompanying drawings.

DESCRIPTION OF REFERENCE NUMERALS (FIG. 1)
1: Feed line connecting a preceding wire-wetting fall polymerizer to co-rotating twin-screw extruder 3
2: Gear pump
3: Co-rotating twin-screw extruder
4: First inlet
5: Second inlet
6: Vent
7: Cooling bath
8: Strand cutter
9: Side feeder
10: Outlet for pellets obtained by cutting strands
(FIG. 2)
1A–6A: Numerals assigned in connection with first vertical agitation type polymerizer vessel (A)
1B–6B: Numerals assigned in connection with first vertical agitation type polymerizer vessel (B)
1C–7C: Numerals assigned in connection with second vertical agitation type polymerizer vessel (C)
101A–111A : Numerals assigned in connection with first wire-wetting fall polymerizer
101B–111B: Numerals assigned in connection with second wire-wetting fall polymerizer
1A, 1B: Inlet for a starting material
1C: Inlet for a prepolymer
2A, 2B, 2C: Vent
3A, 3B: First vertical agitation type polymerizer vessels (A) and (B)
3C: Second vertical agitation type polymerizer vessel (C)
4A, 4B, 4C: Molten prepolymer
5A, 5B, 5C: Outlet
6A, 6B, 6C: Agitator
7C, 9: Transfer pump
101A, 101B: Inlet for a polymerizing material
102A: Recirculation line
103A, 103B: Perforated plate
104A, 104B: Wire
105A, 105B: Gas feed port
106A, 106B: Vent
107A: Recirculation pump
108A: Transfer pump
108B: Discharge pump
109A, 109B: Outlet
110A, 110B: Main body of wire-wetting fall polymerizer
111A: Molten Prepolymer
111B: Molten Polymer
(FIGS. 3 to 5)
103: Perforated plate
104: Wire
121: Hole of a perforated plate
122: Fixation point of wire
123: Support rod for wire

DETAILED DESCRIPTION OF THE INVENTION

According to the present invention, there is provided a method for producing a homogeneous polycarbonate composition, which comprises:

feeding a main polycarbonate in a molten state to a first inlet of an extruder, wherein the main polycarbonate is an aromatic dihydroxy compound/carbonic diester transesterification polycarbonate, while feeding a resin/additive mixture of an auxiliary polycarbonate and at least one additive to a second inlet of the extruder, wherein the main polycarbonate and the auxiliary polycarbonate are the same or different, and wherein the second inlet is disposed downstream of the first inlet as viewed in an extrusion direction of the extruder and disposed at a distance, from an outlet of the extruder, which is sufficient to effect intimate blending of the main polycarbonate with the resin/additive mixture during travel thereof between the second inlet and the outlet of the extruder;

extruding the main polycarbonate and the resin/additive mixture through the extruder while effecting intimate blending thereof; and recovering the resultant polycarbonate composition from the outlet of the extruder.

For easy understanding of the present invention, the essential features and various embodiments of the present invention are enumerated below.

(1) A method for producing a homogeneous polycarbonate composition, which comprises:

feeding a main polycarbonate in a molten state to a first inlet of an extruder, wherein the main polycarbonate is an aromatic dihydroxy compound/carbonic diester transesterification polycarbonate, while feeding a resin/additive mixture of an auxiliary polycarbonate and at least one additive to a second inlet of the extruder, wherein the main polycarbonate and the auxiliary polycarbonate are the same or different, and wherein the second inlet is disposed downstream of the first inlet as viewed in an extrusion direction of the extruder and disposed at a distance, from an outlet of the extruder, which is sufficient to effect intimate blending of the main polycarbonate with the resin/additive mixture during travel thereof between the second inlet and the outlet of the extruder;

extruding the main polycarbonate and the resin/additive mixture through the extruder while effecting intimate blending thereof; and recovering the resultant polycarbonate composition from the outlet of the extruder.

(2) The method according to item (1) above, wherein the feeding of the molten main polycarbonate is performed by directly feeding a molten polycarbonate obtained in a preceding melt transesterification polymerization step;

(3) The method according to item (2) above, wherein the preceding melt transesterification polymerization step comprises:

feeding, to a feeding zone having a perforated plate, at least one polymerizing material selected from the group consisting of:
a molten monomer mixture of an aromatic dihydroxy compound and a carbonic diester, and
a molten prepolymer obtained by reacting an aromatic dihydroxy compound with a carbonic diester,
the perforated plate having at least one hole, the feeding zone communicating, through the at least one hole of the perforated plate, with a polymerization zone comprising a wire-wetting fall polymerization reaction zone, the wire-wetting fall polymerization reaction zone having at least one wire in correspondence with the at least one hole, the at least one wire being securely held at one of two ends thereof in an upper end portion of the wire-wetting fall polymerization reaction zone and extending downwardly through the wire-wetting fall polymerization reaction zone, so that the polymerizing material fed to the feeding zone is enabled to pass downwardly through the perforated plate and fall along and in contact with the at least one wire toward the other end of the at least one wire, and allowing the polymerizing material to pass downwardly through the perforated plate and fall along and in contact with the at least one wire through a wire-wetting fall polymerization reaction zone, to effect a wire-wetting fall polymerization of the polymerizing material, thereby obtaining a polycarbonate at a bottom of the polymerization zone comprising the wire-wetting fall polymerization reaction zone.

(4) The method according to item (1) or (2) above, wherein the feeding of the main polycarbonate to the first inlet is conducted under pressure.

(5) The method according to item (1) or (2) above, wherein the auxiliary polycarbonate is either in granular form, granules of which have an average diameter of from 0.3 mm to 3 mm, or in powder form, particles of which have an average particle diameter of from 1 $\mu$m to 500 $\mu$m.

(6) The method according to item (1) or (2) above, wherein the auxiliary polycarbonate is obtained from an aromatic dihydroxy compound and phosgene, and is either in granular form, granules of which have an average diameter of from 0.3 mm to 3 mm, or in powder form, particles of which have an average particle diameter of from 1 $\mu$m to 500 $\mu$m.

(7) The method according to item (1) or (2) above, wherein the auxiliary polycarbonate has a weight average molecular weight of from 5,000 to a value of 1.1×(weight average molecular weight of the main polycarbonate).

(8) A homogeneous polycarbonate composition, which is substantially the same as a product obtained by the method of item (1) above.

(9) A homogeneous polycarbonate composition, which is substantially the same as a product obtained by the method of item (2) above.

(10) A homogeneous polycarbonate composition, which is substantially the same as a product obtained by the method of item (3) above.

(11) A homogeneous polycarbonate composition, which is substantially the same as a product obtained by the method of item (4) above.

(12) A homogeneous polycarbonate composition, which is substantially the same as a product obtained by the method of item (5) above.

(13) A homogeneous polycarbonate composition, which is substantially the same as a product obtained by the method of item (6) above.

(14) A homogeneous polycarbonate composition, which is substantially the same as a product obtained by the method of item (7) above.

(15) The method according to item (1) above, wherein the second polycarbonate is an aromatic dihydroxy compound/carbonic diester transesterification polycarbonate.

(16) A homogeneous polycarbonate composition obtained by the method of item (15) above.

(17) The method according to item (1) above, wherein the weight of the second polycarbonate is in the range of from 1/200 to 1/20, based on the weight of said first polycarbonate.

In the present invention, the terminology "aromatic dihydroxy compound" means a compound represented by the following formula:

HO—Ar—OH wherein Ar represents a divalent aromatic group.

Preferred examples of divalent aromatic groups as Ar include a group represented by the following formula:

—Ar$^1$—Y—Ar$^2$ wherein each of Ar$^1$ and Ar$^2$ independently represents a divalent carbocyclic or heterocyclic aromatic group having from 5 to 70 carbon atoms, and Y represents a divalent alkane group having from 1 to 30 carbon atoms.

In the divalent carbocyclic or heterocyclic aromatic groups as Ar$^1$ and Ar$^2$, at least one hydrogen atom may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and/or a nitro group.

Examples of heterocyclic aromatic groups as Ar$^1$ and Ar$^2$ include an aromatic group having at least one hetero atom, such as a nitrogen atom, an oxygen atom or a sulfur atom.

Illustrative examples of divalent carbocyclic or heterocyclic aromatic groups as Ar$^1$ and Ar$^2$ include an unsubstituted or substituted phenylene group, an unsubstituted or substituted biphenylene group and an unsubstituted or substituted pyridylene group. Substituents for these groups are as described above.

Examples of divalent alkane groups as Y include organic groups respectively represented by the following formulae:

wherein each of R$^1$, R$^2$, R$^3$ and R$^4$ independently represents a hydrogen atom, an alkyl group having from 1 to 10 carbon atoms, an alkoxy group having from 1 to 10 carbon atoms, a cycloalkyl group having from 5 to 10 ring-forming carbon atoms, a carbocyclic aromatic group having from 5 to 10 ring-forming carbon atoms or a carbocyclic aralkyl group having from 6 to 10 ring-forming carbon atoms; k represents an integer of from 3 to 11; each X represents a carbon atom and has R$^5$ and R$^6$ bonded thereto; each R$^5$ independently represents a hydrogen atom or an alkyl group having from 1 to 6 carbon atoms, and each R$^6$ independently represents a hydrogen atom or an alkyl group having from 1 to 6 carbon atoms, wherein R$^5$ and R$^6$ are the same or different;

wherein at least one hydrogen atom of each of R$^1$, R$^2$, R$^3$, R$^4$, R$^5$ and R$^6$ may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and/or a nitro group.

Specific examples of divalent aromatic groups as Ar include groups respectively represented by the following formulae:

wherein each of $R^7$ and $R^8$ independently represents a hydrogen atom, a halogen atom, an alkyl group having from 1 to 10 carbon atoms, an alkoxy group having from 1 to 10 carbon atoms, a cycloalkyl group having from 5 to 10 ring-forming carbon atoms, or a phenyl group; each of m and n independently represents an integer of from 1 to 4, with the proviso that when m is an integer of from 2 to 4, $R^7$'s are the same or different, and when n is an integer of from 2 to 4, $R^8$'s are the same or different.

Further, examples of divalent aromatic groups as Ar also include those which are represented by the following formula:

—Ar$^1$—Z—Ar$^2$— wherein Ar$^1$ and Ar$^2$ are as defined above; and Z represents a single bond, or a divalent group, such as —O—, —CO—, —S—, —SO$_2$, —SO—, —COO—, or —CON(R$^1$)—, wherein R$^1$ is as defined above.

Examples of such divalent aromatic groups as Ar include groups respectively represented by the following formulae:

wherein $R^7$, $R^8$, m and n are as defined above.

In the present invention, the aromatic dihydroxy compounds can be used individually or in combination. Representative examples of aromatic dihydroxy compounds include bisphenol A. It is preferred to use an aromatic dihydroxy compound having a low content of chlorine atoms and alkali metals or alkaline earth metals. It is more preferred to use an aromatic dihydroxy compound substantially free from a chlorine atom, an alkali metal or an alkaline earth metal.

The carbonic diester used in the present invention is represented by the following formula:

wherein each of $Ar^3$ and $Ar^4$ independently represents a monovalent aromatic group.

In each of $Ar^3$ and $Ar^4$, which independently represents a monovalent carbocyclic or heterocyclic aromatic group, at least one hydrogen atom may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group or a nitro group. $Ar^3$ and $Ar^4$ are the same or different.

Representative examples of monovalent aromatic groups $Ar^3$ and $Ar^4$ include a phenyl group, a naphthyl group, a biphenyl group and a pyridyl group. These groups may or may not be substituted with the above-mentioned substitutent or substituents.

Preferred examples of monovalent aromatic groups as $Ar^3$ and $Ar^4$ include those which are respectively represented by the following formulae:

Representative examples of carbonic diesters include a di(unsubstituted or substituted)phenyl carbonate compound represented by the following formula:

wherein each of $R^9$ and $R^{10}$ independently represents a hydrogen atom, an alkyl group having from 1 to 10 carbon atoms, an alkoxy group having from 1 to 10 carbon atoms, a cycloalkyl group having from 5 to 10 ring-forming carbon atoms or a phenyl group; each of p and q independently represents an integer of from 1 to 5, with the proviso that when p is an integer of 2 or more, $R^9$'s are the same or different, and when q is an integer of from 2 or more, $R^{10}$'s are the same or different.

Of these diphenyl carbonate compounds, preferred are those having a symmetrical configuration, such as di(unsubstituted)phenyl carbonate and a diphenyl carbonate wherein the phenyl group is substituted with a lower alkyl group, e.g., ditolyl carbonate and di-t-butylphenyl carbonate. Particularly preferred is diphenyl carbonate which has the simplest structure.

These carbonic diesters may be used individually or in combination. It is preferred that these carbonic diesters have a low content of chlorine atoms and alkali metals or alkaline earth metals. It is most preferred that these carbonic diesters be substantially free from a chlorine atom and an alkali metal or alkaline earth metal.

The ratio in which the aromatic dihydroxy compound and the carbonic diester are used (i.e., a charging ratio) may vary depending on the types of the aromatic dihydroxy compound and carbonic diester employed, the polymerization temperature and other polymerization conditions, and the desired molecular weight of a polycarbonate to be obtained and the desired proportions of the terminal groups of the polycarbonate. The carbonic diester is generally used in an amount of from 0.9 to 2.5 moles, preferably from 0.95 to 2.0 moles, more preferably from 0.98 to 1.5 moles, per mole of the aromatic dihydroxy compound.

In the present invention, an aromatic polyhydric hydroxy compound, an aromatic monohydroxy compound and/or a carbonic diester other than the above-mentioned carbonic diester can be used in combination with the above-mentioned aromatic dihydroxy compounds and carbonic diesters, as long as the effects of the present invention are not spoiled. The aromatic polyhydric hydroxy compound may be used for introducing a branch structure to the polycarbonate. The aromatic monohydroxy compound and the carbonic diester other than the above-mentioned carbonic diesters may be used for converting the terminal hydroxyl groups of the polycarbonate and the terminal groups derived from the carbonic diester into different types of terminal groups, or for modifying the molecular weight of the polycarbonate.

With respect to the types of terminal groups of the main polycarbonate, there is no particular limitation. With respect to the molecular weight of the main polycarbonate, there is also no particular limitation; however, the weight average molecular weight of the main polycarbonate is generally from 1,000 to 300,000, preferably from 5,000 to 100,000, more preferably from 12,000 to 80,000.

The main polycarbonate used in the method of the present invention is produced from an aromatic dihydroxy compound and a carbonic diester by transesterification therebetween. The transesterification is conducted while heating in the presence or absence of a catalyst under reduced pressure or under an inert gas flow. The mode of the transesterification process, the polymerization equipment and the like are not specifically limited.

Examples of reactors employable for performing the transesterification reaction include an agitation type reactor vessel, a wiped film type reactor, a centrifugal wiped film evaporation type reactor, a surface renewal type twin-screw kneading reactor, a twin-screw horizontal agitation type reactor, a wall-wetting fall reactor, a free-fall reactor having a perforated plate, and a wire-wetting fall reactor having a perforated plate and at least one wire. These various types of reactors can be used individually or in combination.

In a wall-wetting fall polymerization using a wall-wetting fall reactor, at least one polymerizing material selected from the group consisting of:

a molten monomer mixture of an aromatic dihydroxy compound and a carbonic diester, and a molten prepolymer obtained by reacting an aromatic dihydroxy compound with a carbonic diester, is fed in a molten state to an upper portion of a wall extending downwardly through a wall-wetting fall polymerization reaction zone, and allowed to fall along and in contact with the surface of the wall, thereby effecting the polymerization during the wall-wetting fall thereof.

In a free-fall polymerization using a free-fall reactor, the same polymerizing material as mentioned above is fed in a molten state to a feeding zone having a perforated plate and allowed to pass downwardly through the perforated plate and fall freely through a free-fall polymerization reaction zone, thereby effecting the polymerization during the free-fall.

In a wire-wetting fall polymerization using a wire-wetting fall reactor, the same polymerizing material as mentioned above is fed in a molten state to a feeding zone having a perforated plate and allowed to pass downwardly through the perforated plate and fall along and in contact with a wire through a wire-wetting fall polymerization reaction zone, thereby effecting polymerization of the polymerizing material during the wire-wetting fall thereof.

The perforated plate to be used in a wire-wetting fall polymerization has at least one hole. The feeding zone in the wire-wetting fall reactor communicates, through the hole, with a polymerization zone comprising a wire-wetting fall polymerization reaction zone. The wire-wetting fall polymerization reaction zone has at least one wire in correspondence with the hole, and the wire is securely held at one end thereof in an upper end portion of the wire-wetting fall polymerization reaction zone and extends downwardly through the wire-wetting fall polymerization reaction zone.

With respect to the positional relationship between the at least one wire and the perforated plate, and to the positional relationship between the at least one wire and the at least one hole of the perforated plate, there is no particular limitation as long as a polymerizing material fed to the feeding zone is enabled to pass downwardly through the perforated plate and fall along and in contact with the at least one wire toward the lower end of the at least one wire. The wire and perforated plate either may be or may not be in contact with each other.

Figure 3:
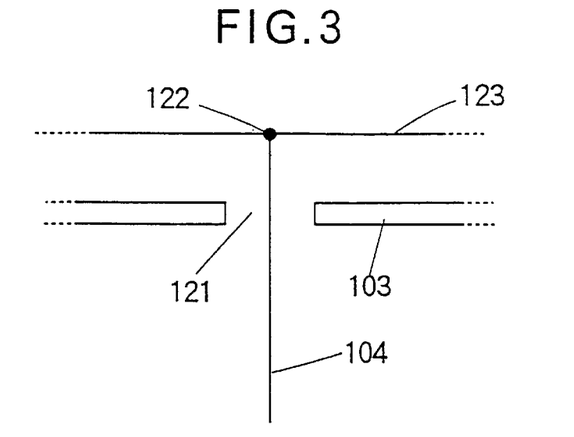
FIGS. 3 to 5 show various manners for securely holding a wire in a wire-wetting fall polymerizer.
Figure 4:
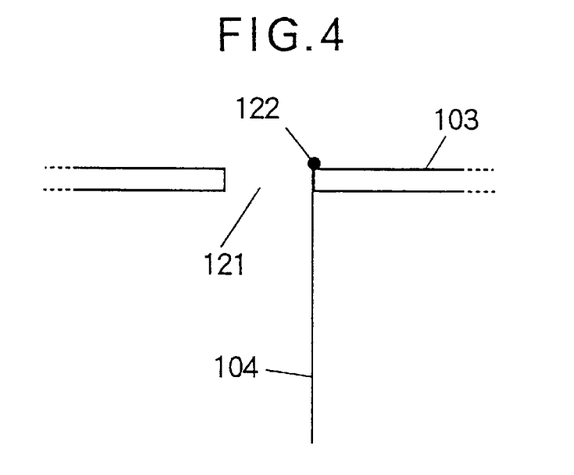
Figure 5:
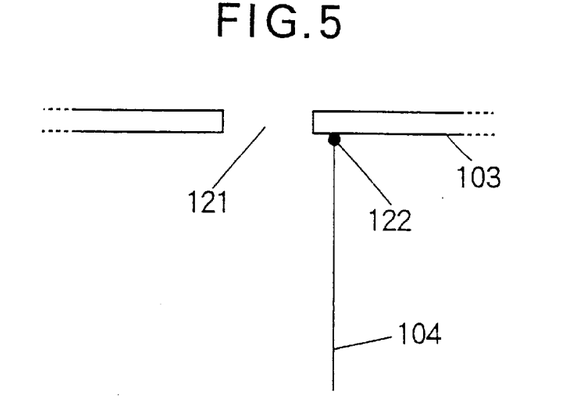

FIGS. 3 to 5 respectively show three examples of manners in which the wire is provided in correspondence with the hole of the perforated plate.

In FIG. 3, the upper end of wire 104 is secured to support rod 123 provided above perforated plate 103, and wire 104 extends downwardly through hole 121 of perforated plate 103. Wire 104 and support rod 123 are secured to each other at fixation point 122. It is possible that support rod 123 be omitted and the upper end of wire 104 be connected, for example, to the upper inner wall surface (not shown) of the wire-wetting fall reactor.

In FIG. 4, the upper end of wire 104 is secured to the upper circumferential edge of hole 121 of perforated plate 103 at fixation point 122, and wire 104 extends downwardly through hole 121 of perforated plate 103.

In FIG. 5, the upper end of wire 104 is secured to the lower surface of perforated plate 103 at fixation point 122, and wire 104 extends downwardly from the lower surface of perforated plate 103.

Alternatively, the upper end of wire 104 may be positioned below hole 121 of perforated plate 103. In such a case, a polymerizing material which has passed downwardly through perforated plate 103 may freely fall before falling along and in contact with wire 104 toward the lower end of wire 104. This embodiment (in which a wire-wetting fall is immediately preceded by a free fall) is enabled, for example, by a method in which a wire is attached to a support rod as shown in FIG. 3, and support rod 123 having wire 104 attached thereto is provided not at a position above perforated plate 103 as shown in FIG. 3, but at a position below perforated plate 103.

Further, the wire-wetting fall polymerization may be followed by a free-fall polymerization wherein a wire-wetting fall polymerized product is consecutively allowed to fall freely through a free-fall polymerization reaction zone after leaving the lower end of the wire, the free-fall polymerization reaction zone being provided downstream of and contiguously to the wire-wetting fall polymerization reaction zone.

The transesterification reaction can be performed by either molten-state polymerization or solid-state polymerization. The transesterification reaction can also be performed by, for example, a method in which a molten-state transesterification is first conducted to obtain a prepolymer, and then the obtained prepolymer is subjected to solid-state polymerization under reduced pressure or under an inert gas flow, thereby elevating the polymerization degree. However, in the method of the present invention, it is preferred that the transesterification reaction be performed by molten-state polymerization, because a polycarbonate obtained by the molten-state polymerization can be directly fed to a first inlet of an extruder. For performing the transesterification reaction by molten-state polymerization, it is preferred that the transesterification reaction be performed using a free-fall reactor having a perforated plate, and a wire-wetting fall reactor having a perforated plate and at least one wire, because the obtained polycarbonate is not likely to suffer discoloration.

The temperature for conducting the transesterification is not specifically limited; however, the temperature is generally selected in the range of from 50° C. to 350° C., preferably from 100° C. to 300° C. In general, when the transesterification reaction temperature is higher than the above-mentioned range, the final polycarbonate exhibits marked discoloration and poor thermal stability. In general, when the transesterification reaction temperature is lower than the above-mentioned range, the reaction rate becomes low, so that the reaction becomes impractical. A suitable reaction pressure is selected depending on the molecular weight of the polycarbonate in the reaction system. When the number average molecular weight of the polycarbonate in the reaction system is less than 1,000, a reaction pressure in the range of from 50 mmHg to atmospheric pressure is generally employed. When the number average molecular weight of the polycarbonate in the reaction system is in the range of from 1,000 to 2,000, a reaction pressure in the range of from 3 mmHg to 80 mmHg is generally employed. When the number average molecular weight of the polycarbonate in the reaction system is more than 2,000, a reaction pressure in the range of from 10 mmHg or less, preferably 5 mmHg or less is generally employed.

The polymerization by the transesterification process may be carried out in the absence of a catalyst. However, when it is desired to accelerate the polymerization rate, the polymerization can be effected in the presence of a catalyst. The polymerization catalysts which are customarily used in the art can be used without particular limitations. Examples of such catalysts include hydroxides of an alkali metal and of an alkaline earth metal, such as lithium hydroxide, sodium hydroxide, potassium hydroxide and calcium hydroxide; alkali metal salts, alkaline earth metal salts and quaternary ammonium salts of boron hydride and of aluminum hydride, such as lithium aluminum hydride, sodium boron hydride and tetramethyl ammonium boron hydride; hydrides of an alkali metal and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as lithium phenoxide, sodium phenoxide, magnesium phenoxide, LiO—Ar—OLi wherein Ar represents an aryl group, and NaO—Ar—ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula $(R^1 R^2 R^3 R^4)NB(R^1 R^2 R^3 R^4)$ wherein $R^1, R^2, R^3$ and $R^4$ are as defined above, and phosphonium borates represented by the formula $(R^1 R^2 R^3 R^4)PB(R^1 R^2 R^3 R^4)$ wherein $R^1, R^2, R^3$ and $R^4$ are as defined above; silicon compounds, such as silicon oxide, sodium silicate, tetraalkylsilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxides; and zirconium compounds, such as zirconium acetate, zirconium oxide, zirconium alkoxides, zirconium aryloxides and zirconium acetylacetone.

These catalysts can be used individually or in combination. The amount of the catalyst to be used is generally in the range of from $10^{-8}$ to 1% by weight, preferably from $10^{-7}$ to $10^{-1}$% by weight, based on the weight of the aromatic dihydroxy compound used as a raw material.

In the present invention, the term "additive" means "thermal stabilizer".

With respect to the thermal stabilizers used in the present invention, a phosphorus stabilizer, a phenolic antioxidant, a sulfur stabilizer, an epoxy stabilizer and a hindered amine stabilizer can be preferably used in the present invention.

Examples of phosphorus stabilizers include phosphorus-containing acids, phosphorous esters, phosphinic esters, phosphoric esters and phosphonic esters. Representative examples of phosphorus-containing acids include phosphoric acid, phosphorous acid, hypophosphorous acid, pyrophosphoric acid, polyphosphoric acid, phosphinic acids represented by the following formula (1):

(1)

and phosphonic acids represented by the following formula (2):

(2)

wherein $R^{11}$ represents an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; or an alkylaryl group, such as a tolyl group, a p-t-butylphenyl group, a 2,4-di-t-butylphenyl group, a 2,6-di-t-butylphenyl group, a paranonylphenyl group and a dinonylphenyl group.

More specific examples of phosphonic acids include phenylphosphonic acid. These compounds can be used individually or in combination.

Examples of phosphorous esters include a phosphorous triester, a phosphorous diester and a phosphorous monoester which are, respectively, represented by the following formulae (3) to (6):

wherein each of $R^{12}$, $R^{13}$, $R^{14}$, $R^{15}$, $R^{16}$, $R^{18}$, $R^{19}$, $R^{20}$, $R^{21}$, $R^{22}$ and $R^{23}$ independently represents a hydrogen atom; an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; or an alkylaryl group, such as a tolyl group, a p-t-butylphenyl group, a 2,4-di-t-butylphenyl group, a 2,6-di-t-butylphenyl group, a para-nonylphenyl group or a dinonylphenyl group; and each of $R^{17}$ and $R^{24}$ independently represents alkylene, allylene or arylalkylene.

Specific examples of phosphorous triesters include tris(2,4-di-t-butylphenyl)phosphite, tris(nonylphenyl)phosphite, tris(dinonylphenyl)phosphite, triphenyl phosphite, tetraphenyldipropylene glycol phosphite, tetra(tridecyl)4,4'-isopropylidene diphenyldiphosphite, bis(tridecyl) pentaerythritol diphosphite, bis(nonylphenyl)pentaerythritol diphosphite, bis(2,4-di-t-butylphenyl)pentaerythritol diphosphite, bis(2,6-di-t-butyl-4-methylphenyl) pentaerythritol diphosphite, distearyl, pentaerythritol diphosphite, hydrogenated bisphenol A pentaerythritol phosphite polymer and tetraphenyltetra(tridecyl)pentaerythritol tetraphosphite. Among these compounds, phosphorous triesters having a 2,4-di-t-butylphenyl group or a 2,6-di-t-butylphenyl group are especially preferred, and specific examples of such especially preferred phosphorous triesters include tris(2,4-di-t-butylphenyl) phosphate, bis(2,4-di-t-butylphenyl)pentaerythritol diphosphite and bis(2,6-di-t-butyl-4-methylphenyl)pentaerythritol diphosphite.

Preferred examples of phosphorous diesters include aromatic phosphorous diesters. Examples of aromatic phosphorous diesters include diphenyl hydrogen phosphite, bis (nonylphenyl) hydrogen phosphate, bis(2,4-di-t-butylphenyl) hydrogen phosphate, dicresyl hydrogen phosphite, bis(p-t-butylphenyl) hydrogen phosphite and bis (p-hexylphenyl) hydrogen phosphite.

Specific examples of phosphorous monoesters include phenyl dihydrogen phosphite, nonylphenyl dihydrogen phosphite and 2,4-di-t-butylphenyl dihydrogen phosphite. These compounds can be used individually or in combination.

Examples of phosphinic esters include phosphinic monoesters and phosphinic diesters represented by the following formulae (7) and (8):

wherein $R^{25}$ represents an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; or an alkylaryl group, such as a tolyl group, a p-t-butylphenyl group, a 2,4-di-t-butylphenyl group, a 2,6-di-t-butylphenyl group, a paranonylphenyl group or a dinonylphenyl group; and each of $R^{26}$, $R^{27}$, $R^{28}$, $R^{29}$, $R^{31}$ and $R^{32}$ independently represents a hydrogen atom; an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; or an alkylaryl group, such as a tolyl group, a p-t-butylphenyl group, a 2,4-di-t-butylphenyl group, a 2,6-di-t-butylphenyl group, a paranonylphenyl group or a dinonylphenyl group; and $R^{30}$ represents alkylene, allylene or arylalkylene.

A representative example of these compounds is tetrakis(2, 4-di-t-butylphenyl) 4,4'-biphenylene diphosphinate. These compounds can be used individually or in combination.

Examples of phosphoric esters include a phosphoric diester and a phosphoric monoester, which are represented by the following formulae (9) to (12):

wherein $R^{13}$, $R^{14}$, $R^{16}$, $R^{17}$, $R^{18}$, $R^{19}$, $R^{21}$, $R^{23}$ and $R^{24}$ are as defined above.

Specific examples of phosphoric diesters include diphenylhydrogen phosphate, bis(nonylphenyl) hydrogen phosphate, bis(2,4-di-t-butylphenyl) hydrogen phosphate, dicresyl hydrogen phosphate, bis(p-t-butylphenyl) hydrogen phosphate and bis(p-hexylphenyl) hydrogen phosphate.

Specific examples of phosphoric monoesters include phenyl dihydrogen phosphate, nonylphenyl dihydrogen phosphate and 2,4-di-t-butylphenyl dihydrogen phophate. These compounds can be used individually or in combination.

Examples of phosphonic esters include phosphonic monoester represented by the following formulae (13) and (14):

(13)

(14)

wherein $R^{25}$, $R^{27}$, $R^{29}$, $R^{30}$, $R^{31}$ and $R^{32}$ are as defined above.

The phenolic antioxidant is represented by the following formula (15):

(15)

wherein each of $R^{33}$s independently represents a hydrogen atom, a hydroxyl group, an alkoxyl group, or an unsubstituted or substituted hydrocarbon residue, with the proviso that at least one of $R^{33}$s represents an unsubstituted or substituted hydrocarbon residue.

Specific examples of the above-mentioned phenolic antioxidants include 2,6-di-t-butyl-p-cresol, 2,6-di-t-butyl-p-anisole, 2,6-di-t-butyl-4-ethylphenol, 2,2'-methylene bis(6-t-butyl-p-cresol), 2,2'-methylene bis(4-ethyl-6-t-butyl-p-phenol), 4,4'-methylene bis(6-t-butyl-p-cresol), 4,4'-butylidene bis(6-t-butyl-m-cresol), tetrakis[methylene-3-(3', 5'-di-t-butyl-4'-hydroxyphenyl)propyonate]methane, 4,4'-thio bis(6-t-butyl-m-cresol), stearyl-β-(3,5-di-t-buty-4-hydroxyphenyl)propionate, 1,3,5-trimethyl-2,4,6-tris(3,5-di-t-butyl-4-hydroxybenzyl)benzene, 1,1,3-tris(2-methyl-4-hydroxy-5-t-butylphenyl)butane and triethylene glycolbis [3-(3-t-butyl-5-methyl-4-hydrox-yphenyl)propionate].

A preferable phenolic antioxidant is represented by the following formula (16):

(16)

wherein $R^{34}$ represents a methyl group or a t-butyl group, $R^{35}$ represents a t-butyl group, A represents a $C_1-C_{30}$ hydrocarbon residue or a $C_1-C_{30}$ heterocyclic residue having a valence of b, a represents an integer of from 1 to 4 and b represent an integer of 1 or more.

Specific examples of the above-mentioned phenolic antioxidants include tetrakis[methylene-3-(3',5'-di-t-butyl-4'-hydroxyphenyl)propionate]methane, stearyl-β-(3,5-di-t-butyl-4-hydroxyphenyl)propionate and triethylene glycolbis[3-(3-t-butyl-5-methyl-4-hydroxyphenyl)propionate].

Further examples of phenolic antioxidants include a phenolic antioxidant containing phosphorus atom, such as 3,5-di-t-butyl-4-hydroxybenzyl phosphonate diethyl ester and calcium bis(3,5-di-t-butyl-4-hydroxybenzyl ethylphosphonate).

These phenolic antioxidants can be used individually or in combination.

Examples of sulfur stabilizers include a sulfinic acid represented by the formula $R^{36}-SO_2-R^{37}$, a sulfonic acid represented by the formula $R^{36}-SO_3-R^{37}$, (in each of these equations, $R^{36}$ is equivalent to $R^{11}$ and $R^{37}$ is equivalent to $R^{12}$), esters thereof, and thioether compounds represented by the following formula (17):

(17)

wherein each of $R^{38}$ and $R^{39}$ independently represents a $C_{12}-C_{18}$ alkyl group.

Specific examples of the above-mentioned sulfur stabilizers include benzenesulfinic acid, p-toluenesulfinic acid, benzenesulfonic acid, p-toluenesulfonic acid, naphthalenesulfonic acid, and a methyl, an ethyl, a butyl, an octyl and a phenylester thereof. Further examples include dilauryl-3, 3'-thiodipropionate, ditridecyl-3,3'-thiodipropionate, dimyristyl-3,3'-thiodipropionate, distearyl-3,3'-thiodipropionate and pentaerythritol(β-laurylthiopropinate). These sulfur stabilizers can be used individually or in combination.

Examples of epoxy stabilizers include epoxy containing fats and oils, such as epoxidated soybean oil and epoxidated linseed oil; glycidyl compounds, such as phenylglycidyl ether, allylglycidyl ether, t-butylphenylglycidyl ether, bisphenol A diglycidyl ether, tetrabromo bisphenol A diglycidyl ether, diglycidyl phthalate, diglycidyl hexahydrophthalate; epoxycyclohexane compounds, such as 3,4-epoxycyclohexylmethyl-3,4-epoxycyclohexane carboxylate, 3,4-epoxy-6-methylcyclohexylmethyl-3,4-epoxycyclohexane carboxylate, 2,3-epoxycyclohexylmethyl-3,4-epoxycyclohexane carboxylate, 4-(3,4-epoxy-5-methylcyclohexyl)butyl-3,4-epoxycyclohexane carboxylate, 3,4-epoxycyclohexylethylene oxide, cyclohexylmethyl-3,4-epoxycyclohexane carboxylate, 3,4-epoxy-6-methylcyclohexylmethyl-6-methylcyclohexane carboxylate, bisepoxycyclohexyl adipate, octadecyl-2,2'-dimethyl-3,4-epoxycyclohexane carboxylate, N-butyl-2,2'-dimethyl-3,4-epoxycyclohexane carboxylate, cyclohexyl-2-methyl-3,4-epoxycyclohexane carboxylate, N-butyl-2-isopropyl-3,4-epoxy-5-methylcyclohexane carboxylate, octadecyl-3,4-epoxycyclohexane carboxylate, 2-ethylhexyl-3,4-epoxycyclohexane carboxylate, 4,6-dimethyl-2,3-epoxycyclohexyl-3,4-epoxycyclohexane carboxylate, diethyl-4,5-epoxy-cis-1,2-cyclohexane carboxylate, di-n-butyl-3-t-butyl-4,5-epoxy-cis-1,2-cyclohexane carboxylate, 3,4-dimethyl-1,2-epoxycyclohexane, 3,5-dimethyl-1,2-epoxycyclohexane and 3-methyl-5-t-butyl-1,2-epoxycyclohexane; bisepoxydicyclopentadienyl ether; butadiene diepoxide; tetraphenylethylene epoxide; epoxidated polybutadiene; 4,5-epoxytetrahydrophthalic anhydride; and 3-t-butyl-4,5-epoxytetrahydrophthalic anhydride. These epoxy stabilizers can be used individually or in combination.

Examples of hindered amine stabilizers include bis(2,2,6,6-tetramethyl-4-piperidyl)sebacate, bis(1,2,6,6-pentamethyl-4-piperidyl)sebacate, 2-(3,5-di-t-butyl-4-hydroxybenzyl)-2-n-butylmalonate bis(1,2,2,6,6-pentamethyl-4-piperidyl)tetraxy(2,2,6,6-tetramethyl-4-piperidyl)1,2,3,4-butane tetracarboxylate, 1-[2-{3-(3,5-di-t-butyl-4-hydroxyphenyl)propionyloxy}ethyl]- 4-{3-(3,5-di-t-butyl-4-hydroxyphenyl)propionyloxy}-2,2,6,6-tetramethylpiperidine, 8-benzyl-7,7,9,9-tetramethyl-3-octhyl-1,2,3-triazaspiro{4,5}undecane-2,4-dione and 4-benzoyloxy-2,2,6,6-tetramethylpiperidine. These hindered amine stabilizers can be used individually or in combination.

These thermal stabilizers can be used individually or in combination. The amounts of thermal stabilizers used are not specifically limited; however, the thermal stabilizer is generally used in an amount of from 0.0001 to 0.5 part by weight, relative to 100 parts by weight of the total of the main polycarbonate and the auxiliary polycarbonate.

These thermal stabilizers are used in liquid form, granular form, powder form or the like, preferably in liquid form or powder form.

In the method of the present invention, a main polycarbonate in a molten state is fed to a first inlet of an extruder, while a resin/additive mixture of an auxiliary polycarbonate and at least one additive is fed to a second inlet of the extruder, wherein the main polycarbonate and the auxiliary polycarbonate are the same or different, to thereby effect intimate blending of the main polycarbonate with the mixture.

In the present invention, a solid polycarbonate, which is formed by cooling a molten polycarbonate obtained by a melt transesterification process or which is obtained by a solid-state transesterification process, may be subjected to heat-melting, to thereby obtain a polycarbonate in a molten state, and the obtained polycarbonate in a molten state may be fed to the first inlet of the extruder as a main polycarbonate. However, it is more preferred that a molten polycarbonate formed by a melt transesterification process, as such, be fed to the first inlet of the extruder as a main polycarbonate. The reason for this resides in that when a molten polycarbonate formed by the melt transesterification process, as such, is fed to the extruder as a main polycarbonate, the main polycarbonate does not experience any additional thermal history, such as cooling, and heating for remelting, so that deterioration of the properties of the polycarbonate can be advantageously suppressed.

There is no particular limitation with respect to an extruder used in the method of the present invention, as long as the extruder has a first inlet and a second inlet which is disposed downstream of the first inlet as viewed in an extrusion direction of the extruder and disposed at a distance, from an outlet of the extruder, which is sufficient to effect intimate blending of the main polycarbonate with the resin/additive mixture during travel thereof between the second inlet and the outlet of the extruder. Examples of extruders include a single-screw extruder, a twin-screw extruder, a multi-screw extruder and a kneading extruder, in which a kneader and an extruder are connected in series. Of these, preferred is a co-rotating twin-screw extruder which is designed so that two screws rotate in the same direction. Such a co-rotating twin-screw extruder not only has excellent self-cleaning ability, but also is advantageous for simultaneously achieving satisfactory dispersion of additives and satisfactory extrusion.

Further, there is no particular limitation with respect to the size (such as length, and inner and outer diameters) of the extruder and the positions of the first inlet and second inlet of the extruder, as long as the above-mentioned requirements are satisfied. However, when an auxiliary polycarbonate fed to the second inlet is in a solid state (i.e., in a form of a pellet, a granule, a powder or the like), it is preferred that, in the extruder, a distance between the second inlet and the outlet be sufficient to melt the auxiliary polycarbonate and effect intimate blending of the main polycarbonate and the resin/additive mixture containing the auxiliary polycarbonate. In this instance, when the inner diameter of the extruder is defined as D, it is preferred that distance between the first inlet and the second inlet be from 1 to 10 D, more preferably from 2 to 6 D, that the distance between the second inlet and the outlet be generally from 5 to 30 D, more preferably from 10 to 25 D, and that the length of the extruder be from 15 to 40 D. On the other hand, when the auxiliary polycarbonate fed to the second inlet is in a molten state, the distance between the second inlet and the outlet and the length of the extruder may be short, as compared to those required for an extruder used when the auxiliary polycarbonate is in a solid state. In this case, it is preferred that the distance between the second inlet and the outlet be from 2 to 30 D, and that the length of the extruder be from 10 to 40 D.

In the present invention, there is no particular limitation with respect to the method for feeding a main polycarbonate in a molten state to the first inlet of the extruder. For example, the feeding of a main polycarbonate to the first inlet, such as a hopper opening, is generally conducted by allowing the main polycarbonate to fall freely through the first inlet or by means of a gear pump and the like. For achieving excellent extrusion, it is preferred that the feeding of the main polycarbonate be conducted by applying a pressure of 1 to 100 kg/cm$^2$ to the main polycarbonate in a gear pump so that the main polycarbonate can be fed to the extruder through a line which is connected, at both ends thereof, to the gear pump and the first inlet by means of flanges.

In the present invention, a resin/additive mixture of an auxiliary polycarbonate and at least one additive is fed to the second inlet of the extruder. When such a resin/additive mixture is fed to the first inlet together with the main polycarbonate, it is difficult to control the feed amount of the resin/additive mixture to an appropriate level, so that it becomes difficult to achieve the effect of the additives. That is, when the main polycarbonate and the resin/additive mixture together are fed to the first inlet, the dispersion of the additive in the polycarbonate becomes non-uniform, so that satisfactory effects aimed at by incorporation of the additive into the polycarbonate cannot be achieved.

In the present invention, with respect to the method for mixing an auxiliary polycarbonate with at least one additive to obtain a resin/additive mixture which is to be fed to the second inlet of the extruder, there can be mentioned a method in which the additive is uniformly mixed with the polycarbonate using a Henschel mixer, a super mixer, a tumbling mixer, a ribbon blender or the like. The obtained resin/additive mixture as such may be fed to the second inlet of the extruder in such a manner as described below, or the obtained resin/additive mixture may be melt extruded using a separate extruder to produce a master batch of the resultant melted mixture and then an appropriate amount of the master batch is taken and fed to the second inlet of the extruder in such a manner as described below.

In the present invention, with respect to the manner of feeding the thus obtained resin/additive mixture to the second inlet of the extruder, there is no particular limitations. In the present invention, generally, the resin/additive mixture may be fed to the extruder through a feeder or through a preliminary extruder.

In the case of feeding the resin/additive mixture through a feeder, any conventional feeders may be used. Examples of feeders include a gravimetric feeder and a volumetric feeder. Each of the gravimetric feeder and volumetric feeder is connected to the second inlet of the extruder directly or through another feeder (corresponding to side feeder 9 in FIG. 1). That is, for feeding the resin/additive mixture in a solid state to the second inlet, for example, the resin/additive mixture in a solid state can be directly fed from a gravimetric feeder or a volumetric feeder; or alternatively, the resin/additive mixture in a solid state may first be fed to a gravimetric feeder or volumetric feeder for measurement of the quantity of the resin/additive mixture, and then fed to another feeder (corresponding to side feeder 9 in FIG. 1) connected to the second inlet of the extruder.

In the case of feeding the resin/additive mixture through a preliminary extruder, the resin/additive mixture in a solid state is fed to a preliminary extruder connected to the second inlet of a main extruder (for extrusion of the main polycarbonate and the resin/additive mixture) so that the resin/additive mixture can be melted before entrance to the main extruder, and then the mixture in a molten state is fed to the second inlet of the main extruder.

In the present invention, fillers, glass fibers, carbon fibers, antioxidants, weathering stabilizers, mold release agents, lubricants, antistatic agents, plasticizers, resins other than polycarbonate or polymers such as rubbers, pigments, dyes, reinforcing agents, flame retardants, recycled polycarbonates and the like can be fed to the second inlet, together with the resin/additive mixture.

When a simple mixture of an auxiliary polycarbonate and an additive, as such, is fed to the second inlet of the extruder, it is preferred that the auxiliary polycarbonate be either in granular form or in powder form, for uniformly mixing the auxiliary polycarbonate with an additive. It is more preferred that the auxiliary polycarbonate be either in granular form, granules of which have an average diameter of from 0.3 mm to 3 mm, or in powder form, particles of which have an average particle diameter of from 1 $\mu$m to 500 $\mu$m, as determined by taking a photomicrograph of the polycarbonate and measuring the diameters of 100 granules (or particles) of the polycarbonate, which were arbitrarily selected from the granules in the photomicrograph [in the present invention, with respect to ellipsoidal granules or particles, the term "average diameter" means length of the major axis of the granule].

As mentioned above, for uniformly mixing the auxiliary polycarbonate with an additive, it is preferred that the auxiliary polycarbonate be either in granular form or in powder form. Therefore, in the present invention, a polycarbonate obtained from an aromatic dihydroxy compound and phosgene by the conventional phosgene process can also be preferably used, because a phosgene-process polycarbonate is easily, commercially available in granular form or in powder form. It is preferred that the phosgene-process polycarbonate be either in granular form, granules of which have an average diameter of from 0.3 mm to 3 mm, or in powder form, particles of which have an average particle diameter of from 1 $\mu$m to 500 $\mu$m.

However, when a polycarbonate obtained by the phosgene process, which inevitably contains a chlorine atom, is used as an auxiliary polycarbonate, it is preferred to use a phosgene-process polycarbonate having a low chlorine atom content, wherein the chlorine atom content of the final polycarbonate composition depends on the amount ratio of the auxiliary polycarbonate to the main polycarbonate. When the chlorine atom content of the auxiliary polycarbonate is high, problems occur, such that the resultant polycarbonate composition is likely to suffer discoloration at the time of molding and the mold or molding machine used is likely to be corroded. Therefore, it is especially preferred to reduce the chlorine atom content of the auxiliary polycarbonate to a level as low as possible. Specifically, it is preferred to reduce the chlorine atom content of the auxiliary polycarbonate so that the chlorine atom content of the final polycarbonate composition becomes 0.5 ppm or less, in terms of chlorine ions, and 1 ppm or less in terms of methylene chloride. The chlorine atom content of the polycarbonate can be reduced by washing the polycarbonate with a solvent, such as acetone.

In the present invention, the main polycarbonate and the auxiliary polycarbonate may be the same or different. In the present invention, "the main polycarbonate and the auxiliary polycarbonate are the same" means that the respective structures and molecular weights of the main polycarbonate and the auxiliary polycarbonate are identical to each other, which are usually obtained by the same production method. On the other hand, "the main polycarbonate and the auxiliary polycarbonate are different" means that the main polycarbonate and the auxiliary polycarbonate are different in structure, molecular weight or production method. As a method for obtaining an auxiliary polycarbonate which is the same as the main polycarbonate, there can be mentioned a method in which a portion of the main polycarbonate in a molten state is taken before feeding of the main polycarbonate to a first inlet of an extruder, or a method in which a portion of the polycarbonate composition obtained by the method of the present invention is used, wherein the polycarbonate component of the polycarbonate composition serves as the auxiliary polycarbonate which is the same as the main polycarbonate.

With respect to the molecular weight of the auxiliary polycarbonate, there is no particular limitation. However, from the viewpoint of improving dispersion of the additive in the main polycarbonate, it is preferred that the auxiliary polycarbonate have a weight average molecular weight of from 5,000 to a value of 1.1×(weight average molecular weight of the main polycarbonate).

The weight of auxiliary polycarbonate is generally in the range of from 1/200 to 1/20, based on the weight of the main polycarbonate.

A suitable weight ratio of an additive to an auxiliary polycarbonate is determined, depending on the weight ratio of the auxiliary polycarbonate to the main polycarbonate. For uniformly dispersing an additive in a main polycarbonate efficiently, the weight ratio of an additive to an auxiliary polycarbonate is generally in the range of from 0.002/100 to 100/100.

As mentioned above, by the method of the present invention, an additive can be uniformly dispersed in a molten polycarbonate without dissolving the additive in a solvent, so that a homogeneous polycarbonate composition can be obtained. Because no solvent is used for dispersing an additive, such as a thermal stabilizer, lowering of the thermal stability of the polycarbonate composition can be avoided, so that the polycarbonate composition produced by the method of the present invention has various excellent properties, such as excellent thermal stability. Therefore, the polycarbonate composition produced by the method of the present invention can be advantageously used in various application fields.

BEST MODE FOR CARRYING OUT THE INVENTION

Hereinbelow, the present invention will be described in more detail with reference to the following Examples and Comparative Examples, but they should not be construed as limiting the scope of the present invention.

In the following Examples and Comparative Examples, evaluation and quantitative determination were conducted by the following methods.

(1) Determination of the average diameter of a polycarbonate in granular or powder form:

A photomicrograph of a polycarbonate was taken, and the diameters of 100 granules (or particles) of the polycarbonate, which were arbitrarily selected from the granules in the photomicrograph, were individually measured. From the measured diameters, the average diameter of the polycarbonate was determined.

(2) Evaluation of the color of a polycarbonate composition:

The color of the polycarbonate produced was evaluated, using a specimen having a thickness of 3.2 mm, in accordance with the CIELAB method (Comission Internationale de l'Eclairage 1976 L*a*b* Diagram), and the yellowness of the specimen is expressed in terms of the b*-value. The larger the b*-value of a specimen, the higher the yellowness of the specimen.

(3) Evaluation of the thermal stability of a polycarbonate composition:

The yellowness (in terms of b*-value) of a dumbbell specimen (ASTM #1) of a polycarbonate composition was determined. Then, the specimen was heated at 140° C. in a Geer oven for 1,000 hours, and the yellowness of the heated specimen was determined. The difference in yellowness (which difference is expressed in terms of the Δb*-value) between the unheated specimen and the heated specimen was taken as an index of the thermal stability of the specimen. The smaller the Δb*-value of a specimen, the higher the thermal stability of the specimen.

(4) Determination of the chlorine ion content of a polycarbonate composition:

A polycarbonate composition was frozen and pulverized. The pulverized polycarbonate composition was subjected to extraction with boiling water for 10 hours to thereby obtain an extract. Chlorine ions contained in the obtained extract were quantitatively determined by ion chromatography, to thereby obtain the chlorine ion content of the polycarbonate composition.

(5) Determination of the methylene chloride content of a polycarbonate composition:

A polycarbonate composition was frozen and pulverized. The pulverized polycarbonate composition was placed in carbon disulfide and then, subjected to ultrasonic extraction to thereby obtain an extract. Methylene chloride contained in the obtained extract was quantitatively determined by gas chromatography, to thereby obtain the methylene chloride content of the polycarbonate composition.

Example 1

A homogeneous polycarbonate composition was produced from a polycarbonate (which had been obtained from bisphenol A and diphenyl carbonate by melt transesterification) and tris(2,4-di-t-butylphenyl) phosphite as an additive. The procedure for obtaining the polycarbonate from bisphenol A and diphenyl carbonate is described in Step 1 below. The procedure for producing the homogeneous polycarbonate composition from the polycarbonate obtained in Step 1 and tris(2,4-di-t-butylphenyl) phosphite is described in Step 2 below. Step 1 (Production of a polycarbonate by melt transesterification)

Figure 2:
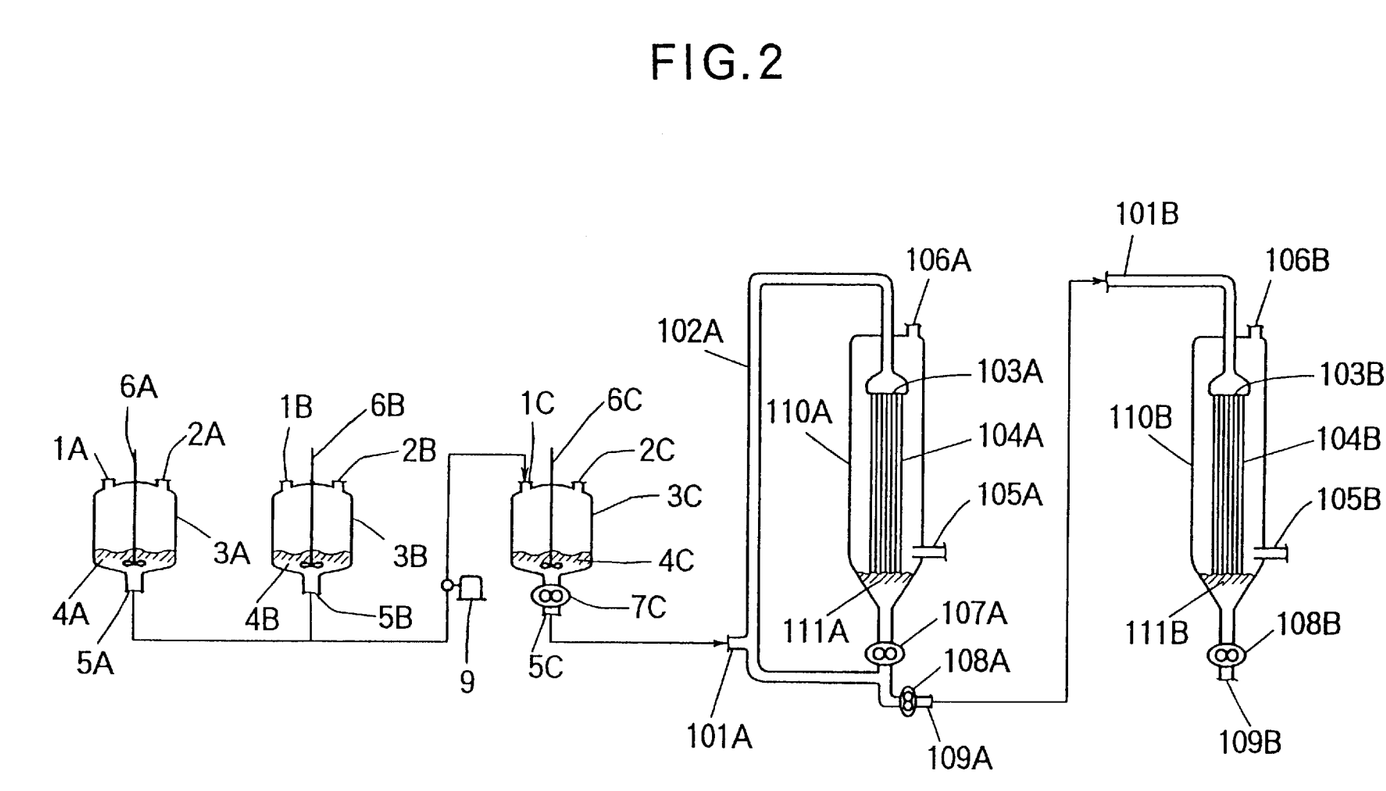
FIG. 2 is a diagram showing the system employed for producing a polycarbonate in Step 1 of Example 1.

A polycarbonate was produced by melt transesterification in accordance with a system as shown in FIG. 2. The system of FIG. 2 comprises first stage and second stage agitation polymerizations, and first stage and second stage wire-wetting fall polymerizations.

In the first stage wire-wetting fall polymerization, first wire-wetting fall polymerizer 110A was used. In the second stage wire-wetting fall polymerization, second wire-wetting fall polymerizer 110B was used. Each of the first and second wire-wetting fall polymerizers is equipped with a perforated plate which has 200 holes having a diameter of 7.5 mm and arranged in a zigzag configuration. In each of the first and second wire-wetting fall polymerizers, 50 strands of 1 mmφ SUS 316 L wires are hung vertically from the respective holes of the perforated plate to a reservoir portion at the bottom of the wire-wetting fall polymerizer so that a polymerizing material will not fall freely (i.e., not free-fall) but fall along and in contact with the wires (i.e., wire-wetting fall). Illustratively stated, as shown in FIG. 3, each wire 104 is secured at the upper end thereof to support rod 123 provided above perforated plate 103, and extends downwardly through hole 121 of perforated plate 103. In each of the first and second wire-wetting fall polymerizers, the wire-wetting fall distance is 8 m. Only first wire-wetting fall polymerizer 110A has a recirculation line.

The first stage agitation polymerization in first agitation type polymerizer vessels 3A and 3B, each having a capacity of 1,000 liters, was batchwise conducted, whereas the second stage agitation polymerization in second agitation type polymerizer vessel 3C, having a capacity of 500 liters, and the first stage and second stage wire-wetting fall polymerizations in first and second wire-wetting fall polymerizers 110A and 110B, were continuously conducted.

The polymerization reaction conditions in both of first agitation type polymerizer vessels 3A and 3B were as follows: the reaction temperature was 180° C., the reaction pressure was atmospheric pressure, and the flow rate of nitrogen gas was 2 liters/hr.

In operation, polymerizing materials [a monomer mixture of bisphenol A and diphenyl carbonate (each being substantially free of a chlorine atom) in a molar ratio of 1:1.10 and, as a catalyst, disodium salt of bisphenol A (the molar ratio of disodium salt of bisphenol A to bisphenol A in the monomer mixture was $2.8 \times 10^{-8}:1$)] were charged into each of first agitation type polymerizer vessels 3A and 3B. The monomer mixture in polymerizer 3A was polymerized in a molten state while agitating for 5 hours to obtain prepolymer 4A. Outlet 5A was opened, and prepolymer 4A was fed to second agitation type polymerizer vessel 3C, having a capacity of 500 liters, at a flow rate of about 90 liters/hr.

While feeding prepolymer 4A obtained in first agitation type polymerizer vessel 3A to second agitation type polymerizer vessel 3C, first agitation type polymerizer vessel 3B was operated to polymerize the monomer mixture of bisphenol A and diphenyl carbonate in the same manner as in the agitation polymerization in first agitation type polymerizer vessel 3A, to obtain prepolymer 4B.

When first agitation type polymerizer vessel 3A became empty, outlet 5A of polymerizer 3A was closed and, instead, outlet 5B of polymerizer 3B was opened, so that prepolymer 4B was fed from first agitation type polymerizer vessel 3B to second agitation type polymerizer vessel 3C at a flow rate of about 90 liters/hr. In this instance, the same polymerizing materials as mentioned above were charged in polymerizer 3A. While feeding prepolymer 4B obtained in first agitation type polymerizer vessel 3B to second agitation type polymerizer vessel 3C, polymerizer vessel 3A was operated, so that the monomer mixture charged therein was polymerized in the same manner as mentioned above.

With respect to a batchwise polymerization in first agitation type polymerizer vessels 3A and 3B and to the alternate feedings of prepolymers 4A and 4B from polymerizers 3A and 3B to second agitation type polymerizer vessel 3C, the same operation as mentioned above was repeated, so that the prepolymer (either prepolymer 4A or prepolymer 4B, alternately) was continuously fed to second agitation type polymerizer vessel 3C.

In second agitation type polymerizer vessel 3C, a further agitation polymerization of prepolymers 4A and 4B, alternately fed from first agitation type polymerizer vessels 3A and 3B, was continuously carried out under polymerization reaction conditions wherein the reaction temperature was 250° C., the reaction pressure was 90 mmHg and the flow rate of nitrogen gas was 3 liters/hr, thereby obtaining prepolymer 4C.

When the volume of prepolymer 4C in second agitation type polymerizer vessel 3C reached 300 liters, part of prepolymer 4C was continuously fed to first wire-wetting fall polymerizer 110A so that the volume of prepolymer 4C in second agitation type polymerizer vessel 3C was constantly maintained at 300 liters. The feeding of prepolymer 4C to first wire-wetting fall polymerizer 110A was conducted through inlet 101A provided in recirculation line 102A for polymerizer In first wire-wetting fall polymerizer 110A, a wire-wetting fall polymerization of prepolymer 4C was continuously carried out under polymerization reaction conditions wherein the reaction temperature was 255° C., and the reaction pressure was 4.5 mmHg and the flow rate of nitrogen gas was 2 liters/hr, thereby obtaining prepolymer 111A, while recirculating a part of obtained prepolymer 111A to the feeding zone (having perforated plate 103A) of first wire-wetting fall polymerizer 110A through recirculation line 102A at a recirculation rate of 1,000 liters/hr.

When the volume of prepolymer 111A at the bottom of first wire-wetting fall polymerizer 110A reached 50 liters, part of prepolymer 111A was continuously fed to second wire-wetting fall polymerizer 110B so that the volume of prepolymer 111A in first wire-wetting fall polymerizer 110A was constantly maintained at 50 liters.

In second wire-wetting fall polymerizer 110B, a wire-wetting fall polymerization reaction was continuously carried out under polymerization reaction conditions wherein the reaction temperature was 260° C., and the reaction pressure was 0.7 mmHg and the flow rate of nitrogen gas was 2 liters/hr, thereby obtaining polycarbonate 111B.

When the volume of polycarbonate 111B at the bottom of second wire-wetting fall polymerizer 110B reached 50 liters, polycarbonate 111B was continuously withdrawn from second wire-wetting fall polymerizer 110B through outlet 109B by means of discharge pump 108B so that the volume of polycarbonate 111B in second wire-wetting fall polymerizer 110B was constantly maintained at 50 liters.

The polycarbonate obtained by the above-mentioned series of polymerization reactions had a weight average molecular weight of 25,000 as measured by gel permeation chromatography (GPC).

Step 2 (Production of a homogeneous polycarbonate composition)

Figure 1:
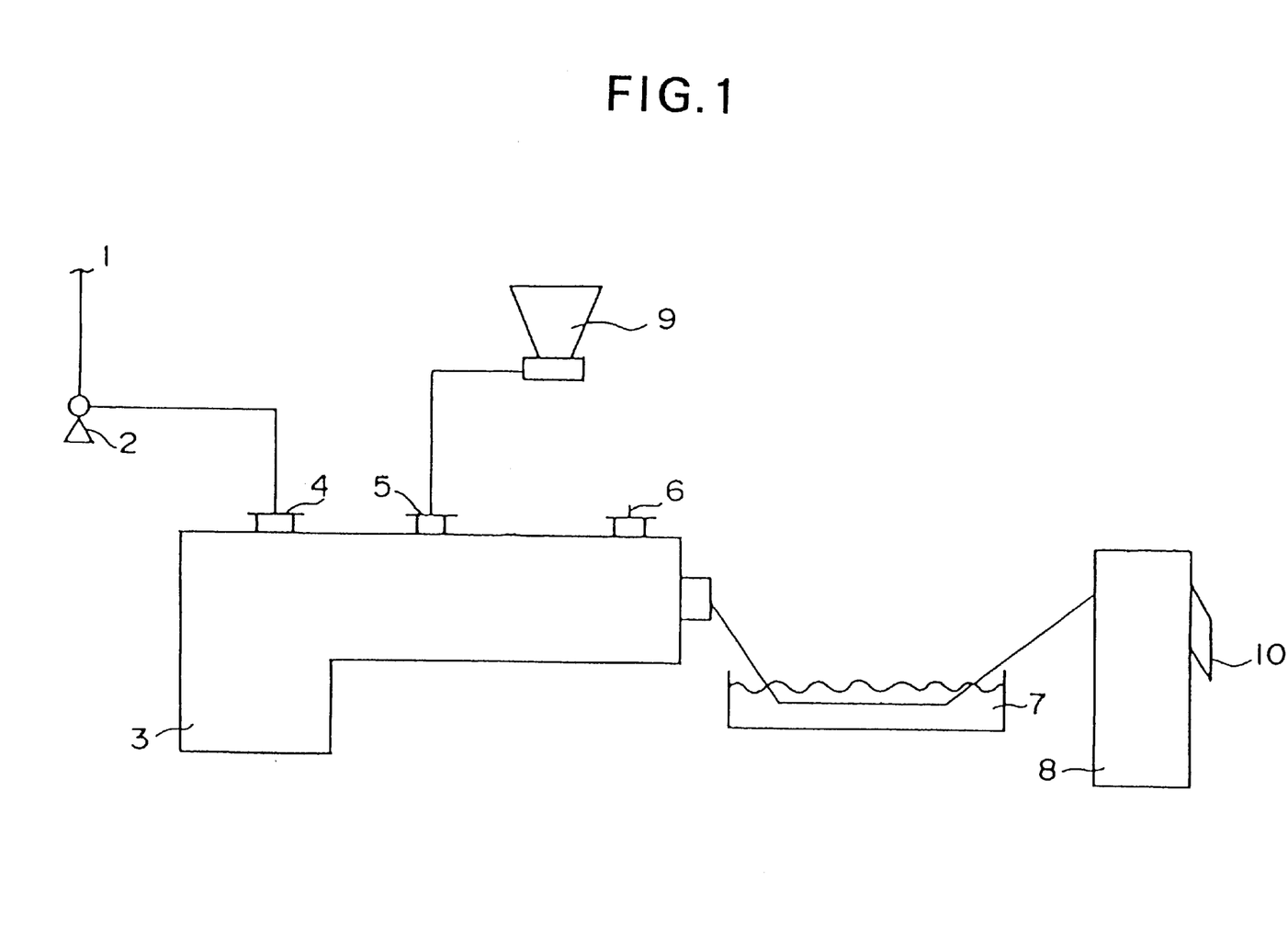
FIG. 1 is a diagram showing the system employed for producing a homogeneous polycarbonate composition in Step 2 of Example 1.

Using the polycarbonate obtained from bisphenol A and diphenyl carbonate by melt transesterification in Step 1 above, a homogeneous polycarbonate composition was produced in accordance with a system as shown in FIG. 1. In the system shown in FIG. 1, use was made of co-rotating twin-screw extruder 3 having first inlet 4, second inlet 5 and vent 6, wherein the diameter of each of the screws is 45 mm, and the L/D ratio is 21.5, the distance between first inlet 4 and second inlet 5 is 2.5 D (wherein D represents the diameter of the extruder), and the distance between second inlet 5 and vent 6 is 9 D.

In operation, the polycarbonate which had been obtained by melt transesterification in Step 1 above was fed to first inlet 4 of co-rotating twin-screw extruder 3, in which the temperature was set at 260° C., at a feeding rate of 50 kg/hr through line 1 (which was connected to outlet 109B of wire-wetting fall polymerizer 110B shown in FIG. 2) by means of gear pump 2 by which the pressure of the polycarbonate was elevated to 20 kg/cm$^2$. On the other hand, a mixture, which had been prepared by well blending, by means of a Henschel mixer, 0.5 part by weight of tris(2,4-di-butylphenyl) phosphite and 99.5 parts by weight of ellipsoidal granules of an auxiliary polycarbonate (which was the same as the polycarbonate fed from first inlet 4) having an average diameter (major axis) of 2.5 mm, was fed from side feeder 9 to second inlet 5 at a feeding rate of 1.0 kg/hr. Melt extrusion was conducted while discharging generated gas through vent 6, and the resultant extrudate was transferred to cooling bath 7. The cooled extrudate was subjected to cutting by means of strand cutter 8, thereby obtaining a pelletized homogeneous polycarbonate composition. The obtained homogeneous polycarbonate composition was recovered from outlet 10 of strand cutter 8.

The obtained homogeneous polycarbonate composition had a b*-value of 3.2. The thermal stability of the homogeneous polycarbonate composition was evaluated by the method as mentioned above. As a result, it was found that the homogeneous polycarbonate composition had a Δb*-value of 8.2, showing that the composition had excellent thermal stability.

Example 2

Substantially the same procedure as in Step 2 of Example 1 was repeated, except that use was made of an auxiliary polycarbonate in powder form (average particle diameter: 200 μm; weight average molecular weight: 21,000; chlorine ion content: 0.7 ppm; and methylene chloride content: 9 ppm), which had been produced from bisphenol A and phosgene by the conventional phosgene process. Thus, a homogeneous polycarbonate composition was obtained. With respect to the obtained homogeneous polycarbonate composition, the chlorine ion content was less than the detection limit (that is, no chlorine ion was detected), and the methylene chloride content was 0.1 ppm. The homogeneous polycarbonate composition had a b*-value of 3.3. The thermal stability of the homogeneous polycarbonate composition was evaluated by the method as mentioned above. As a result, it was found that the homogeneous polycarbonate composition had a Δb*-value of 9.1, showing that the composition had excellent thermal stability.

Comparative Example 1

Using the polycarbonate having a weight average molecular weight of 25,000 as measured by GPC, which had been obtained from bisphenol A and diphenyl carbonate by melt transesterification in the same manner as in Step 1 of Example 1, a polycarbonate composition was produced in a manner as described below, in accordance with substantially the same system as shown in FIG. 1 except that use was made of another type of co-rotating twin-screw extruder which was different from the co-rotating twin-screw extruder 3 shown in FIG. 1 in that second inlet 5 was closed, and a third inlet (not shown in FIG. 1) was provided downstream of second inlet 5 at a distance of 3 D from second inlet 5.

The polycarbonate was fed to first inlet 4 of co-rotating twin-screw extruder 3, in which the temperature was set at 260° C., at a feeding rate of 50 kg/hr through line 1 (which was connected to outlet 109B of wire-wetting fall polymerizer 110B shown in FIG. 2) by means of gear pump 2 by which the pressure of the polycarbonate was elevated to 10 kg/cm$^2$. On the other hand, a 4% by weight solution of tris(2,4-di-butylphenyl) phosphite in methylene chloride was fed from the third inlet at a feeding rate of 120 ml/hr. Melt extrusion was conducted while discharging generated gas through vent 6, and the resultant extrudate was transferred to cooling bath 7. The cooled extrudate was subjected to cutting by means of strand cutter 8, thereby obtaining a pelletized polycarbonate composition. The obtained polycarbonate composition was recovered from outlet 10 of strand cutter 8.

The obtained polycarbonate composition had a methylene chloride content of 78 ppm, and had a b*-value of 3.9. The thermal stability of the polycarbonate composition was evaluated by the method as mentioned above. As a result, it was found that the polycarbonate composition had a Δb*-value of 17.7, showing that the composition had poor thermal stability.

Comparative Example 2

Substantially the same procedure as in Step 2 of Example 1 was repeated, except that the auxiliary polycarbonate was not fed from second inlet 5, and only tris(2,4-di-t-butylphenyl) phosphite was fed from second inlet 5 at a feeding rate of 5 g/hr by manual operation [a feeder capable of continuously feeding a material at such a low feeding rate was not commercially available and, hence, the tris(2,4-di-t-butylphenyl) phosphite was intermittently fed to second inlet 5 by manual operation so that the feeding rate became 5 g/hr]. Thus, a polycarbonate composition was obtained.

The obtained polycarbonate composition had a b*-value of 4.3. The thermal stability of the polycarbonate composition was evaluated by the method as mentioned above. As a result, it was found that the polycarbonate composition had a Δb*-value of 23.6, showing that the composition had poor thermal stability.

INDUSTRIAL APPLICABILITY

By the method of the present invention, an additive can be uniformly dispersed in a molten polycarbonate without dissolving the additive in a solvent, so that a polycarbonate composition having various excellent properties, such as excellent thermal stability, can be produced. Especially when a molten polycarbonate obtained by a melt transesterification process is mixed with the additive by the method of the present invention, production of a polycarbonate composition having various excellent properties can be conducted efficiently. The method of the present invention has extremely high commercial value.

I claim:

1. A method for producing a homogeneous polycarbonate composition having an improved level of thermal stability, which comprises:

feeding a first polycarbonate in a molten state to a first inlet of an extruder, wherein said first polycarbonate is an aromatic dihydroxy compound/carbonic diester transesterification polycarbonate having not experienced cooling of a transesterification polycarbonate to a solid and heating for remelting said solid during production of said first polycarbonate, while feeding a mixture of a second polycarbonate and at least one thermal stabilizer to a second inlet of said extruder, wherein said second polycarbonate is a member selected from the group consisting of a polycarbonate obtained from an aromatic dihydroxy compound and phosgene and an aromatic dihydroxy compound/carbonic diester transesterification polycarbonate in a molten state or in pellet form, wherein said at least one thermal stabilizer is used in an amount of from 0.001 to 0.5 part by weight, relative to 100 parts by weight of the total of the first and second polycarbonates, and wherein said second inlet is disposed downstream of said first inlet as viewed in an extrusion direction of said extruder and disposed at a distance, from an outlet of said extruder, which is sufficient to effect intimate blending of said first polycarbonate with said mixture during travel thereof between said second inlet and said outlet of the extruder;

extruding said first polycarbonate and said mixture in molten state through said extruder while effecting intimate blending thereof, to thereby produce a polycarbonate composition having an improved level of thermal stability; and recovering the produced polycarbonate composition from the outlet of said extruder.

2. The method according to claim 1, wherein the feeding of said molten first polycarbonate is performed by directly feeding a molten polycarbonate obtained in a preceding melt transesterification polymerization step.

3. The method according to claim 2, wherein said preceding melt transesterification polymerization step comprises:

feeding, to a feeding zone having a perforated plate, at least one polymerizing material selected from the group consisting of:

a molten monomer mixture of an aromatic dihydroxy compound and a carbonic diester, and a molten prepolymer obtained by reacting an aromatic dihydroxy compound with a carbonic diester, said perforated plate having at least one hole, said feeding zone communicating, through said at least one hole of the perforated plate, with a polymerization zone comprising a wire-wetting fall polymerization reaction zone, said wire-wetting fall polymerization reaction zone having at least one wire in correspondence with said at least one hole, said at least one wire being securely held at one of two ends thereof in an upper end portion of said wire-wetting fall polymerization reaction zone and extending downwardly through said wire-wetting fall polymerization reaction zone, so that said polymerizing material fed to the feeding zone is enabled to pass downwardly through said perforated plate and fall along and in contact with said at least one wire toward the other end of said at least one wire, and allowing said polymerizing material to pass downwardly through said perforated plate and fall along and in contact with said at least one wire through a wire-wetting fall polymerization reaction zone, to effect a wire-wetting fall polymerization of said polymerizing material, thereby obtaining a polycarbonate at a bottom of said polymerization zone comprising said wire-wetting fall polymerization reaction zone.

4. A homogeneous polycarbonate composition obtained by the method of claim 3.

5. A homogeneous polycarbonate composition, which is essentially a product obtained by the method of claim 2.

6. The method according to claim 1, wherein the feeding of said first polycarbonate to said first inlet is conducted under pressure.

7. A homogeneous polycarbonate composition obtained by the method of claim 6.

8. The method according to claim 1, wherein said second polycarbonate is either in granular form, granules of which have an average diameter of from 0.3 mm to 3 mm, or in powder form, particles of which have an average particle diameter of from 1 $\mu$m to 500 $\mu$m.

9. A homogeneous polycarbonate composition obtained by the method of claim 8.

10. The method according to claim 1, wherein said second polycarbonate is obtained from an aromatic dihydroxy compound and phosgene, and is either in granular form, granules of which have an average diameter of from 0.3 mm to 3 mm, or in powder form, particles of which have an average particle diameter of from 1 $\mu$m to 500 $\mu$m.

11. A homogeneous polycarbonate composition obtained by the method of claim 10.

12. The method according to claim 1, wherein said second polycarbonate has a weight average molecular weight of from 5,000 to a value of 1.1×(weight average molecular weight of said main polycarbonate).

13. A homogeneous polycarbonate composition, obtained by the method of claim 12.

14. A homogeneous polycarbonate composition, which is essentially a product obtained by the method of claim 1.

15. A method according to claim 1, wherein said second polycarbonate is an aromatic dihydroxy compound/carbonic diester transesterification polycarbonate.

16. A homogeneous polycarbonate composition obtained by the method of claim 15.

17. The method according to claim 1, wherein the weight of said second polycarbonate is in the range of from 1/200 to 1/20, based on the weight of said first polycarbonate.

18. A method for producing a homogeneous polycarbonate composition having an improved level of thermal stability, which comprises:

feeding a first polycarbonate in a molten state to a first inlet of an extruder, wherein said first polycarbonate is an aromatic dihydroxy compound/carbonic diester transesterification polycarbonate which has not experienced any additional thermal history, while feeding a mixture of a second polycarbonate and at least one thermal stabilizer to a second inlet of said extruder wherein said second polycarbonate is a member selected from the group consisting of a polycarbonate obtained from an aromatic dihydroxy compound and phosgene and an aromatic dihydroxy compound/carbonic diester transesterification polycarbonate in a molten state or in pellet form, wherein said at least one thermal stabilizer is in an amount of 0.001 to 0.5 part by weight, relative to 100 parts by weight of the total of the first and second polycarbonates, and wherein said second inlet is disposed downstream of said first inlet as viewed in an extrusion direction of said extruder and disposed at a distance, from an outlet of said extruder, which is sufficient to effect intimate blending of said first polycarbonate with said mixture during travel thereof between said second inlet and said outlet of the extruder;

extruding said first polycarbonate and said mixture in said molten state through said extruder while effecting intimate blending thereof, to thereby produce a polycarbonate composition having an improved level of thermal stability; and recovering the produced polycarbonate composition from the outlet of said extruder.

\* \* \* \* \*